United States Patent [19]

Flint

[11] Patent Number: 5,736,201

[45] Date of Patent: Apr. 7, 1998

[54] PROCESS FOR MAKING A DOLL'S HEAD LOOKING LIKE THE HEAD OF A LIVING PERSON

[76] Inventor: Mary Linda Flint, 217 Artillery Rd., Middlebury, Conn. 06762

[21] Appl. No.: 665,304

[22] Filed: Jun. 17, 1996

Related U.S. Application Data

[62] Division of Ser. No. 439,881, May 12, 1995, Pat. No. 5,596,503.

[51] Int. Cl.⁶ .................. B05D 1/04; B05D 5/06; G06F 17/50
[52] U.S. Cl. .................. 427/466; 427/256; 364/468.25; 446/391
[58] Field of Search .................. 427/8, 466, 256; 446/391; 118/681; 364/468.25

[56] References Cited

U.S. PATENT DOCUMENTS

| | | | |
|---|---|---|---|
| 5,059,266 | 10/1991 | Yamane et al. | 156/64 |
| 5,280,305 | 1/1994 | Monroe et al. | 346/107 R |
| 5,429,682 | 7/1995 | Harlow, Jr. et al. | 118/681 |
| 5,596,503 | 1/1997 | Flint | 364/468.25 |

*Primary Examiner*—Michael Lusignan
*Assistant Examiner*—Fred J. Parker
*Attorney, Agent, or Firm*—Dallett Hoopes

[57] ABSTRACT

The process involves rotating the person on a first rotatable support and scanning the rotating head with respect to both topography and color. The scanning output is digitized and fed to a computer with custom software. On a second rotatable support are forming means driven by the computer and used to fashion a partly finished doll's head based on the topography input. The partly finished head is then transferred to a third rotatable support and as it rotates, ink jets also driven by the computer software, colors the doll's head correspondingly.

2 Claims, 1 Drawing Sheet

PROCESS FOR MAKING A DOLL'S HEAD LOOKING LIKE THE HEAD OF A LIVING PERSON

This is a Division of application Ser. No. 08/439,881, filed May 12, 1995, now U.S. Pat. No. 5,596,503.

BACKGROUND OF THE INVENTION

This invention relates to a process for making a three-dimensional doll's head looking like the head of a living person. More specifically, the invention relates to a process for scanning the head of a living person, digitizing the results and using them to drive separate means for forming and coloring a doll's head.

In my U.S. Pat. No. 5,314,370 issued May 24, 1994, I have disclosed the process for producing a doll's head having the face of a given person by directing a video camera at the person, digitizing the results and using them in a color transfer printer to form a wax image on a carrier. The wax image is then transferred to the cotton fabric of a doll's blank face. This process has enabled the production of a "look-alike" doll and has met commercial success.

While my invention has enabled the production of what is essentially a two-dimensional facial resemblance on a three-dimensional stock doll head, there has been a need expressed by my customers for means to form a three-dimensional "look-alike" doll.

SUMMARY OF THE INVENTION

The invention, therefore, is a process for making a look-alike three-dimensional doll's head looking like the head of a living person. It involves the step of positioning the person on a first rotatable support and immobilizing the person's head relative to the support. This support and person are rotated, while from the fixed position a laser scanner vertically scans the rotating head with respect to topography and simultaneously a video camera scans for color. The digital results are fed into computer software.

On a second rotatable support forming means driven by the computer are used to fashion a partly finished doll's head. The forming may be done either simultaneously with the scanning of the living person's head or after the scanning at a time selected by the operator. The partly finished head is then transferred to a third rotatable support and as it rotates, the computer drives means to color the doll's head correspondingly to the person's head based on the color input to the video camera. The rotation of the second and third supports are coordinated with the control signals so that the control signals are appropriate for the rotary positions of the head being made.

BRIEF DESCRIPTION OF THE DRAWINGS

Other features and objects of the invention will be apparent from the following specification with the appended drawings wherein the FIGURE is a flow diagram of a process embodying the invention.

DESCRIPTION OF THE PREFERRED EMBODIMENT

Figure 1:
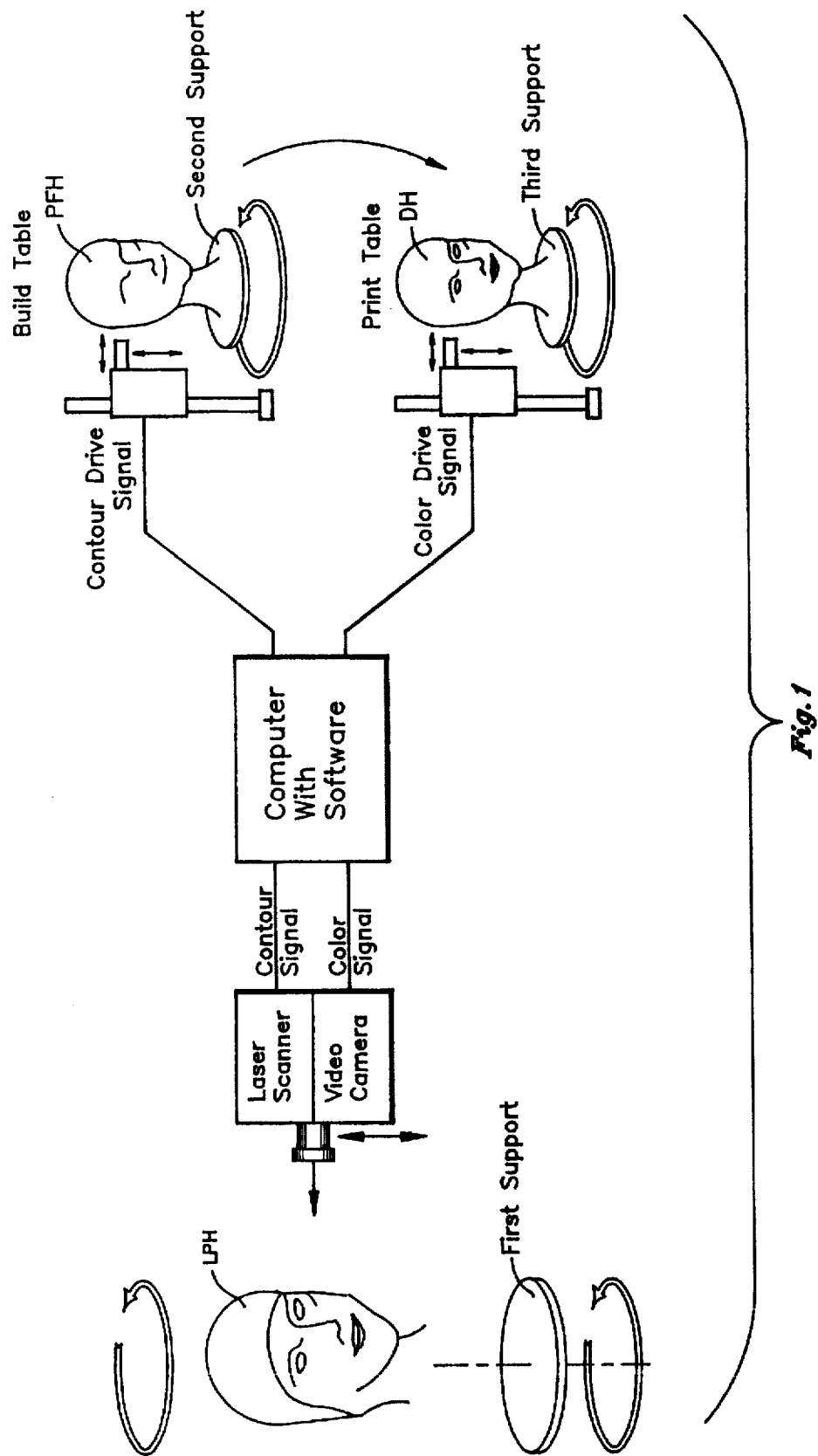

A flow diagram of a process embodying the invention is shown. In the drawing the living person's head is identified as LPH. At the start of the process the person is seated on a first support which rotates at a given rate. Means are provided to hold the head still, for instance, in the form of a cradle partly embracing the head from the rear in a relatively inconspicuous way and anchored to a chair or other support on the turntable. The person wears a skull or bathing cap to eliminate the hair as the subject of the scanning.

A laser scanner which may be in the form of a "Replica" scanning system is stationed adjacent the rotating head LPH but is supported in a fixed position. Such a scanner is available from United Scanning Technologies, Inc. of Vancouver, British Columbia V6J 4S5. It is used to record the topography of the head LPH as it rotates to produce a digitized signal which is fed into the IBM-compatible computer as shown.

Simultaneously, a video camera may be used to produce a digitized color coordinate signal for the colors of the head LPH digitizing in the three separate primary colors (RGB or CYMK) as the head rotates.

Preferably the scanner and camera are close together and scan over the head LPH in unison; that is, the laser scanner and the camera proceed together at the same rate focusing simultaneously on the same points on the head, moving together up and down as the head rotates. Ideally this may be accomplished by a system of lenses and moving motorized mirrors oscillating in uniform sweeps so that the effect is that the video camera and laser scanner work from the same source and measure the distance from the source to each surface point on the head and the color of the surface head at each point. The focusing of the video camera will be continuously effected by the output of the laser scanner depending on the distance measured to the target point at a given instant by the scanner.

The digitized signals from the scanning and video operation are fed as distance code and as raw color code into appropriate software in the computer. The information in the computer may be used to build the head as it comes in or may be stored for later use.

As shown in the drawing, also provided are a second and third rotatable support, the first of which may be referred to as the build table. The build table rotates in a motion consistent with the speed of the signal produced by the scanner so that as it rotates, the signal is appropriate for the same rotary position on the partly finished head PFH as originated from that position on the head LPH.

A building gun is mounted in vertically moveable fashion and on a separate support adjacent the build table and builds up on a core or build surface as the table rotates a mass reflective of the contours of the head LPH. The building is done from a gun comprising two ink jet leads—one to deposit thermoplastic building material and the other to deposit a supporting wax which supports the thermoplastic till it is cured.

The deposited materials are ejected from the ink jets as a hot liquid which solidifies upon impact with the cooler build surface. This selective deposition process permits the traces to be placed adjacent one another to produce a uniform layer of materials. The ink jets deposit material along a line at rates up to 12 inches per second.

The first layers of material will be applied to the core, wooden or plastic, in a uniform layer and as the rotation continues only after the layers reach the thickness required to impact on the shape of the PFH will the depositing selectively cut off as the head begins to take the final desired exterior shape. When the signal from the computer indicates that there is no more depositing to be done, the head is partially finished, without color. Such building equipment is available under the trademark "MODEL MAKER" from Sanders Prototype Inc., Wilton, N.H. 03086.

As an alternate method, in a subtractive fabrication, a blank oversized head can be mounted on the build table and a milling tool driven by the software removes material from the blank head so that what is left corresponds to a replica of the contours of the head LPH. Such a process is available from Cyberware Laboratories Inc.

The partly finished head PFH, after the operation on the build table is removed and transferred to a second rotating support or print table. Adjacent the rotating print table is a coloring ink jet assembly mounted on a separate support. The jet assembly is mounted to be spaced closely adjacent the head PFH and to deposit thereon as the assembly moves vertically depositing a primary color corresponding to the degree of its presence on the living head scanned by the video camera. A pass is necessary then for each of the primary colors.

The support of the jet assembly is shown only schematically as instructed by the digitized information in the computer in the drawing but is arranged so that the jets move in and out depending on the contour of the head PFH thereadjacent as directed by the digitized information in the computer file. This assures that the color reproduction by the color dots deposited by the ink jets will replicate the head LPH as accurately as possible. The ink jets may deposit as many as 4000 dots of color per inch. As stated, one rotation of the head for each of the primary colors RBG or CYMK is necessary for the coloration of the head. If desired or necessary, a validation circuit may validate that the ink jets are depositing the appropriate amount of the correct material.

When the doll head DH is finished, its shape and color closely resemble those of the head LPH. An appropriate wig may be selected and applied to cause the head to more closely resemble the living person's head. The head DH may be applied to a doll body which can be clothed as desired to further imitate the living person subject.

It will be noted that by having separate build and print tables and the ability of the computer to store the video and the laser scanner input for playout into the ink jet appliers, respectively, the process described permits the operator to make the most efficient use of the apparatus. For instance, the build table can be used to build a head from a previous subject while the print table can be used to finish up the head of a still earlier subject and a new subject can be on the first support being scanned and videoed.

As indicated throughout, the process of the invention is not limited to the specific embodiment shown but is of a scope defined by the following claim language which may be broadened by an extension of the right to exclude others from making, using or selling the invention as is appropriate under the doctrine of equivalents.

What is claimed is:

1. A process for coloring a doll's head to look like a living person comprising the steps of rotating the living person a full 360° and scanning the head of the living person with a color video camera successively for each of the primary colors in successive adjacent vertical lines to produce a color signal, rotating the doll's head and applying successively different primary color inks to successive adjacent vertical lines on the head corresponding to the color signal.

2. A process for coloring a doll's head to look like a living person comprising the steps of rotating the living person a full 360° and scanning the head of the living person in successive vertical scan lines with a color video camera from a fixed station successively for each of the primary colors to produce a color signal for each of the primary colors, rotating the doll's head a full 360° and for each primary color applying in sequence different primary color inks corresponding to the color signal for that primary color to successive adjacent lines on the doll's head corresponding to the color signal for that primary color and the same rotary position on the head of the living person.

* * * * *